United States Patent
Krishnan et al.

(10) Patent No.: US 10,981,518 B1
(45) Date of Patent: Apr. 20, 2021

(54) VEHICLE SENSOR ASSEMBLY

(71) Applicant: Ford Global Technologies, LLC, Dearborn, MI (US)

(72) Inventors: Venkatesh Krishnan, Canton, MI (US); Anthony Michael Regalbuto, Ann Arbor, MI (US); Rashaun Phinisee, Ypsilanti Township, MI (US); Tamika Donaldson, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/591,226

(22) Filed: Oct. 2, 2019

(51) Int. Cl.
| | |
|---|---|
| *B60R 11/04* | (2006.01) |
| *B60Q 1/00* | (2006.01) |
| *B60Q 1/30* | (2006.01) |
| *E05F 15/73* | (2015.01) |
| *B60J 5/10* | (2006.01) |
| *H04N 7/18* | (2006.01) |

(52) U.S. Cl.
CPC ............... *B60R 11/04* (2013.01); *B60J 5/10* (2013.01); *B60Q 1/0023* (2013.01); *B60Q 1/30* (2013.01); *E05F 15/73* (2015.01); *H04N 7/18* (2013.01); *B60R 2300/10* (2013.01); *B60R 2300/301* (2013.01); *B60R 2300/80* (2013.01); *E05F 2015/767* (2015.01)

(58) Field of Classification Search
CPC .............. B60R 11/04; B60R 2300/301; B60R 2300/10; B60R 2300/80; E05F 15/73; E05F 2015/767; B60J 5/10; H04N 7/18; B60Q 1/0023; B60Q 1/30
See application file for complete search history.

(56) References Cited

U.S. PATENT DOCUMENTS

| | | |
|---|---|---|
| 9,150,165 B1 | 10/2015 | Fortin et al. |
| 9,826,200 B2 | 11/2017 | Stein |
| 10,226,990 B2 | 3/2019 | Fuchs et al. |
| 2002/0084675 A1 | 7/2002 | Buchanan, Jr. et al. |
| 2013/0128039 A1* | 5/2013 | Meier ............. B60Q 1/00 348/143 |
| 2017/0036647 A1* | 2/2017 | Zhao ............... B08B 3/02 |
| 2017/0305360 A1* | 10/2017 | Zajac ............. G01C 3/08 |
| 2018/0093644 A1* | 4/2018 | Lin ............. G02B 27/0006 |
| 2018/0297519 A1 | 10/2018 | Singh |
| 2019/0128040 A1* | 5/2019 | Mitchell ........... G01S 13/931 |
| 2019/0310470 A1* | 10/2019 | Weindorf ........... B60R 11/04 |
| 2020/0064483 A1* | 2/2020 | Li ............. G01S 17/87 |

FOREIGN PATENT DOCUMENTS

| | | |
|---|---|---|
| WO | 2009152956 A1 | 12/2009 |
| WO | 2016117328 A1 | 7/2016 |

* cited by examiner

*Primary Examiner* — James M Pontius
(74) *Attorney, Agent, or Firm* — Frank A. MacKenzie; Bejin Bieneman PLC

(57) ABSTRACT

An assembly includes a liftgate and an autonomous navigation sensor assembly supported by the liftgate. The autonomous navigation sensor assembly has a plurality of sensors and a vent facing across a field-of-view of one of the sensors.

17 Claims, 6 Drawing Sheets

_US 10,981,518 B1_

VEHICLE SENSOR ASSEMBLY

BACKGROUND

A vehicle may operate in an autonomous mode, a semiautonomous mode, or a nonautonomous mode. In the autonomous mode each of a propulsion system, a braking system, and a steering system of the vehicle are controlled by a computer of the vehicle. In a semiautonomous mode the computer controls one or two of the propulsion, braking, and steering systems. In a nonautonomous mode, a human operator controls the propulsion, braking, and steering systems. The computer may control the propulsion, braking, and/or steering systems based on data from one or more sensors.

The sensors detect the external world and generate data, e.g., transmittable via a communication bus or the like to the computer. The sensors may be, for example, radar sensors, scanning laser range finders, light detection and ranging (LIDAR) devices, and image processing sensors such as cameras.

DETAILED DESCRIPTION

Figure 1:
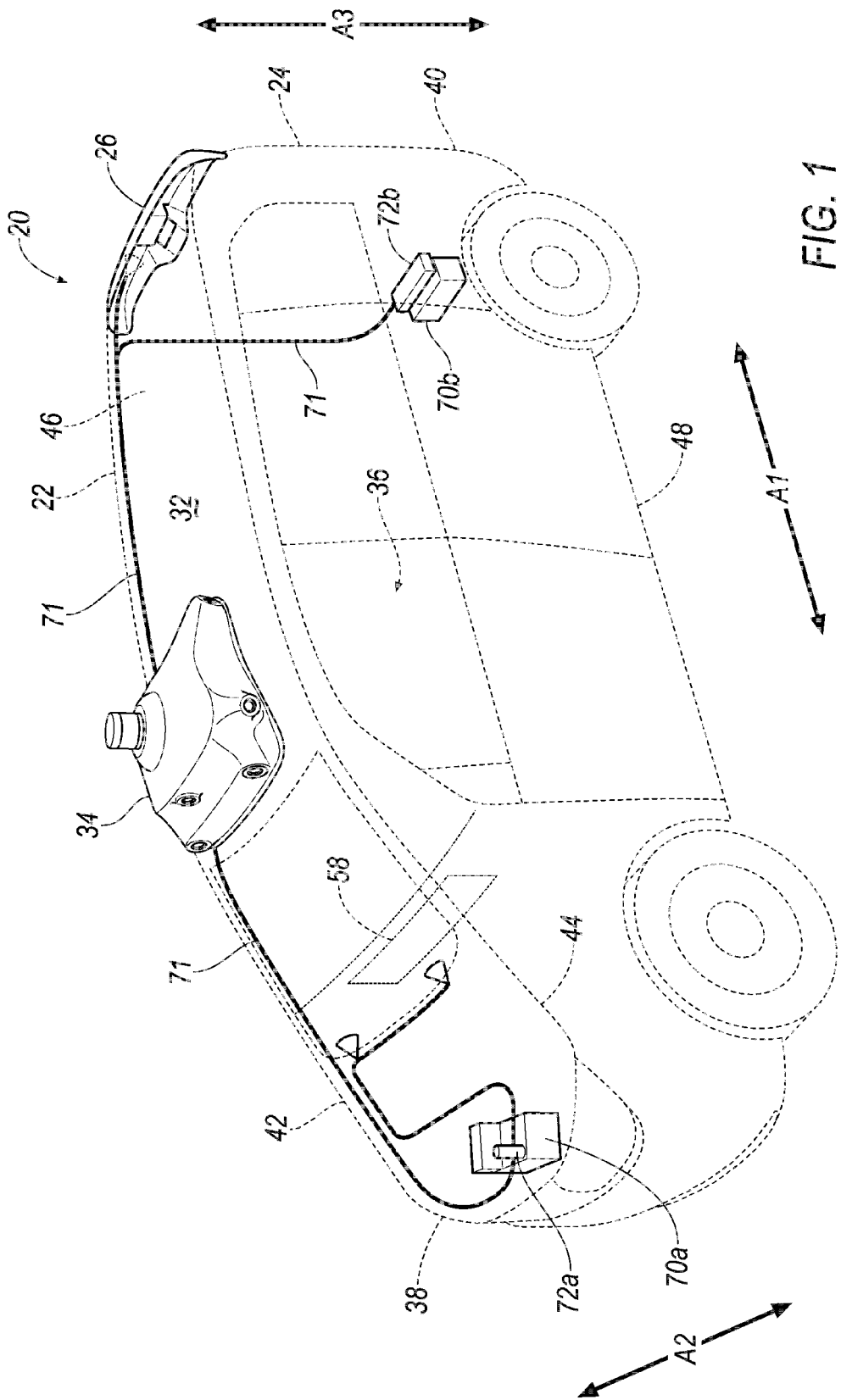
FIG. 1 is a perspective view of a vehicle having a sensor assembly.

An assembly includes a liftgate and an autonomous navigation sensor assembly supported by the liftgate. The autonomous navigation sensor assembly has a plurality of sensors and a vent facing across a field-of-view of one of the sensors.

The assembly may include a window supported by the liftgate, the autonomous navigation sensor assembly above the window.

The plurality of sensors may include a LIDAR sensor.

The autonomous navigation sensor assembly may include a blower in fluid communication with the vent.

The autonomous navigation sensor assembly may include an air inlet.

The autonomous navigation sensor assembly may include a nozzle pointed at least one of the sensors.

A vehicle includes a liftgate and an autonomous navigation sensor assembly supported by the liftgate and having sensor a plurality of sensors. The vehicle includes a computer in communication with the autonomous navigation sensor assembly and programed to operate the vehicle in an autonomous mode based on data from the autonomous navigation sensor assembly.

The vehicle may include a rearview camera supported by the liftgate and a video screen supported in a passenger cabin of the vehicle in communication with the rearview camera.

The autonomous navigation sensor assembly may be spaced from the rearview camera.

The plurality of sensors may include a far-field camera and the rearview camera may be a near-field camera.

The vehicle may include a roof and a second autonomous navigation sensor assembly supported on the roof and in communication with the computer.

The computer may be programmed to fuse data from the autonomous navigation sensor assembly and the second autonomous navigation sensor assembly.

The vehicle may include a roof and a hinge pivotally supporting the liftgate relative to the roof, the autonomous navigation sensor assembly at the hinge.

The vehicle may include a first fluid reservoir and a first pump in fluid communication with the autonomous navigation sensor assembly.

The vehicle may include a second fluid reservoir and a second pump at a rear of the vehicle, the first fluid reservoir and the first pump at a front of the vehicle.

The vehicle may include a second autonomous navigation sensor assembly in fluid communication with the second fluid reservoir and the second pump.

The autonomous navigation sensor assembly may be elongated along a cross-vehicle axis.

The autonomous navigation sensor assembly may be at a top of the liftgate.

The autonomous navigation sensor assembly may include a vent facing across a field-of-view of one of the sensors.

The autonomous navigation sensor assembly may include a nozzle pointed at one of the sensors.

With reference to the Figures, wherein like numerals indicate like parts throughout the several views, an assembly 20 for collecting data to operate a vehicle 22 in an autonomous mode includes a liftgate 24 and an autonomous navigation sensor assembly 26 supported by the liftgate 24. The autonomous navigation sensor assembly 26 has a plurality of sensors 28 and a vent 30 facing across a field-of-view FV of one of the sensors 28.

The sensors 28 of autonomous navigation sensor assembly 26 may generate data specifying a detected area relative to the vehicle 22 that is outside of a field-of-view FV of other sensors 28 of the vehicle 22. For example, a roof 32 of the vehicle 22 may block a field-of-view FV of sensors 28 of a second autonomous navigation sensor assembly 34 of the vehicle 22, and the sensors 28 of autonomous navigation sensor assembly 26 may generate data specifying such area.

The adjectives "first" and "second" are used throughout this document as identifiers and are not intended to signify importance or order.

The vehicle 22 may be any type of passenger or commercial vehicle such as a car, a truck, a sport utility vehicle, a crossover vehicle, a van, a minivan, a station wagon, etc. The vehicle 22 may include a passenger cabin 36 to house occupants, if any, of the vehicle 22. The vehicle 22 may include the roof 32, e.g., above the passenger cabin 36.

The vehicle 22 defines a longitudinal axis A1, e.g., extending between a front 38 and a rear 40 of the vehicle 22. The vehicle 22 defines a cross-vehicle axis A2, e.g., extending between a right side 42 and a left side 44 of the vehicle 22. The vehicle 22 defines a vertical axis A3, e.g., extending between a top 46 and a bottom 48 of the vehicle 22. The longitudinal axis A1, the cross-vehicle axis A2, and the vertical axis A3 are perpendicular to each other.

The vehicle 22 may operate in an autonomous mode, a semiautonomous mode, or a nonautonomous mode. For purposes of this disclosure, an autonomous mode is defined as one in which each of a propulsion system, a braking system, and a steering system are controlled by a computer 50 of the vehicle 22; in a semiautonomous mode the computer 50 controls one or two of the propulsion system, the braking system, and the steering system; in a nonautonomous mode, a human operator controls the propulsion system, the braking system, and the steering system.

The liftgate 24 provides access at the rear 40 of the vehicle 22 to the passenger cabin 36 and/or a cargo area of the vehicle 22. The liftgate 24 may move between an open position permitting access to the passenger cabin 36/cargo area and a closed position restricting access to the passenger cabin 36/cargo area. For example, the vehicle 22 may include a hinge 52 pivotally supporting the liftgate 24 relative to the roof 32. The hinge 52 may have a first hinge portion fixed relative to the roof 32, a second hinge portion fixed relative to the liftgate 24, and a pin connecting the first hinge portion and the second hinge portion. The pin may allow rotational motion of the second hinge portion relative to the first hinge portion. The pin may be elongated along the cross-vehicle axis A2.

A window 54 may be supported by the liftgate 24. The window 54 may be formed of a durable transparent material, including glass, such as laminated glass, tempered glass, etc., or plastic such as Plexiglas, polycarbonate, etc., or any other suitable material. The window 54 may permit an operator of the vehicle 22 to view an area behind the vehicle 22 from within the passenger cabin 36, e.g., via a rearview mirror mounted on a windshield of the vehicle 22.

Figure 2:
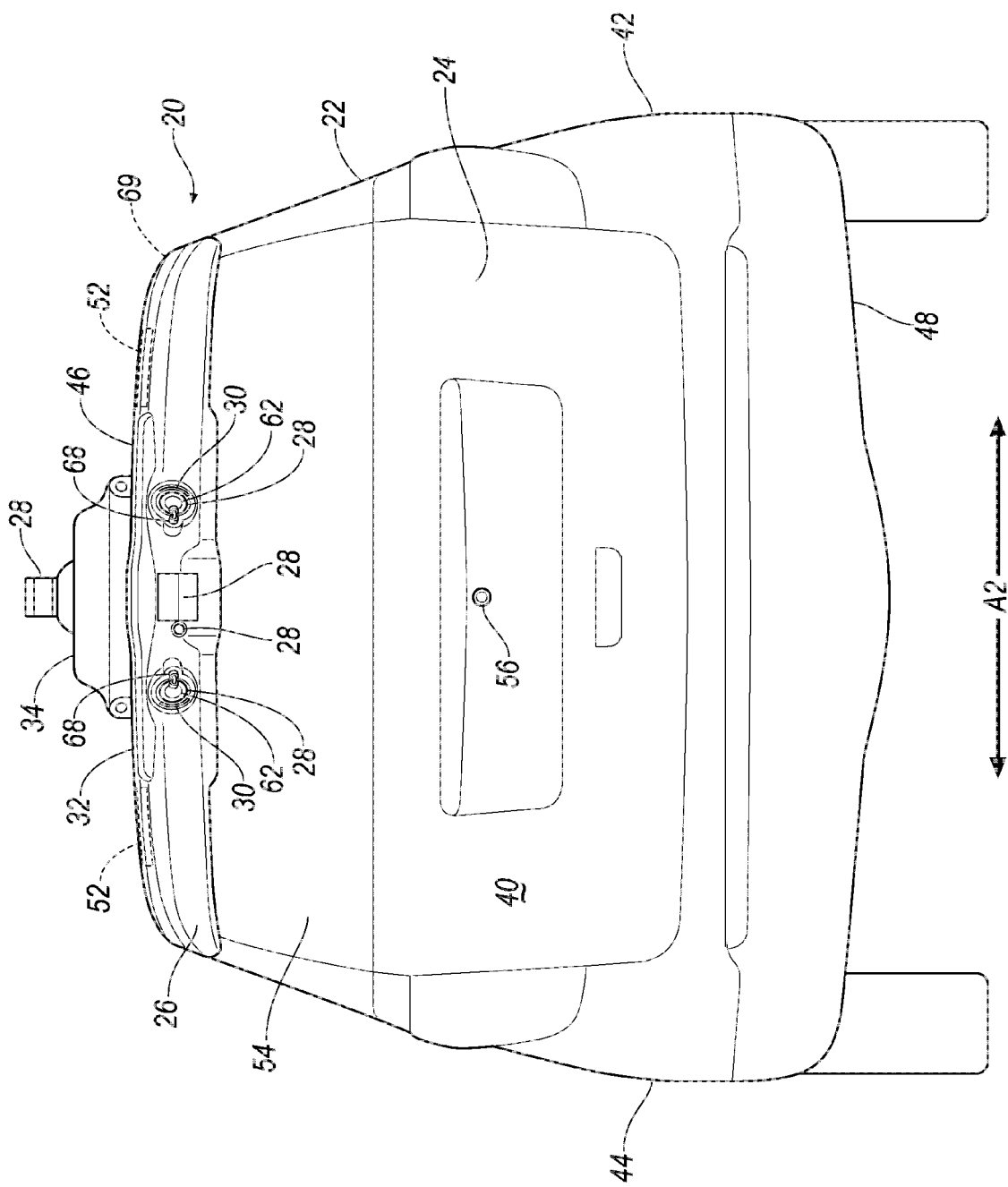
FIG. 2 is a rear view of the vehicle having the sensor assembly.
Figure 3:
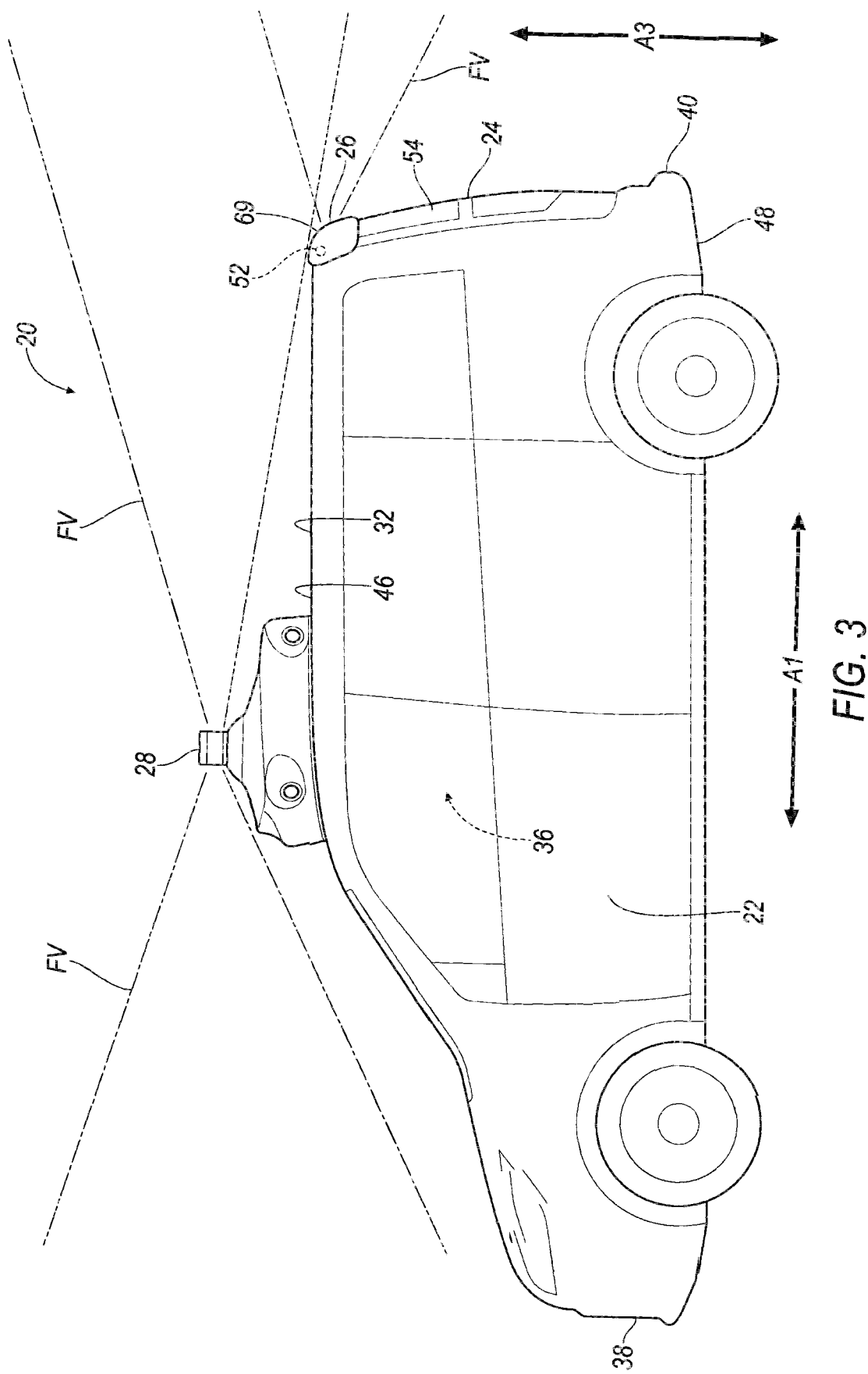
FIG. 3 is a side view of the vehicle having the sensor assembly.
Figure 6:
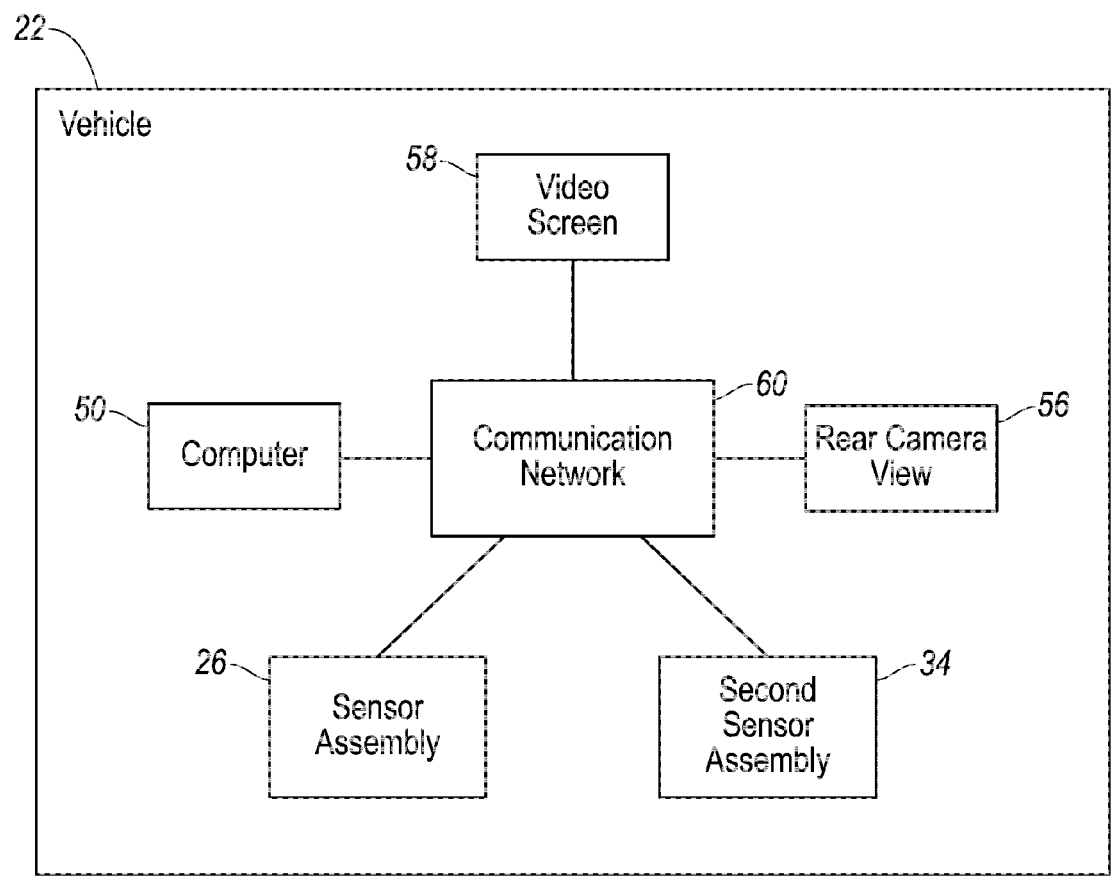
FIG. 6 is a block diagram of components of the vehicle.

The vehicle 22 may include a rearview camera 56 (also conventionally referred to as a backup camera), as illustrated in FIGS. 2 and 6. The rearview camera 56 generates data specifying an area behind the vehicle 22. The rearview camera 56 may include circuits, chips, etc., configured to generate such data. For example, the rearview camera 56 may include a CMOS image sensor, a CCD image sensor, etc. The rearview camera 56 may be a near-field camera (also conventionally referred to as a near-range camera). The near-field camera generates data from detected light and specifying an image, etc., surrounding the vehicle 22 within a specified range, e.g., 10 yards. The near-field camera may use conventional algorithms or the like to compensate for visual effects, such as fish-eye, such that an operator of the vehicle 22 can see a natural and easy to understand image of surroundings rearward of the vehicle 22.

The rearview camera 56 may be supported by the liftgate 24. For example, the rearview camera 56 may be fixed to the liftgate 24 with a fastener or the like. The rearview camera 56 may be below the window 54 of the liftgate 24 relative to the vertical axis A3. In other words, the rearview camera 56 may be between the window 54 of the liftgate 24 and the bottom 48 of the vehicle 22.

The vehicle 22 may include a video screen 58, as illustrated in FIGS. 1 and 6. The video screen 58 generates an image based on data specifying such image, e.g., based on data from the rearview camera 56. For example, the video screen 58 may be a liquid-crystal display (conventionally referred to as an LCD screen). Additionally or alternatively, the video screen 58 may be a touch-sensitive display screen, or other suit display screen.

The video screen 58 may be supported in the passenger cabin 36 of the vehicle 22. For example, the video screen 58 may be located on an instrument panel in the passenger cabin 36 of the vehicle 22, or wherever may be readily seen by the occupant of the vehicle 22.

Video screen 58 is in communication with the rearview camera 56 such that data generated by the rearview camera 56 may be used by the video screen 58 to generate an image. For example, the video screen 58 may be in communication with the rearview camera 56 via a communication network 60 of the vehicle 22 (described below).

The rearview camera 56 and the video screen 58 enable an operator of the vehicle 22 to see behind the vehicle 22, e.g., while the vehicle 22 is operating in reverse. The rearview camera 56 and the video screen 58 may be within the scope of regulatory requirements for the vehicle 22, such as National Highway Traffic Safety Administration (NHTSA) requirement FMVSS 111 (also referred to as 49 CFR § 571.111).

The autonomous navigation sensor assembly 26 generates data specifying an area relative to the vehicle 22 for use by the computer 50 to operate the vehicle 22 in the autonomous mode. The autonomous navigation sensor assembly 26 may include a base, a housing, etc., that supports components of the autonomous navigation sensor assembly 26 such as the sensors 28, etc. The autonomous navigation sensor assembly 26, e.g., the housing, base, etc., may be elongated along the cross-vehicle axis A2. In other words, the autonomous navigation sensor assembly 26 may be wider relative to the cross-vehicle axis A2 that the autonomous navigation sensor assembly 26 is tall along the vertical axis A3 and long along the longitudinal axis A1.

The plurality of sensors 28 of the autonomous navigation sensor assembly 26 detect an area relative to the vehicle 22 and generate data specifying such area. The data is transmittable via the communication network 60 or the like to the computer 50. The sensors 28 may be, for example, radar sensors, scanning laser range finders, a light detection and ranging (LIDAR) sensor, and image processing sensors such as cameras, e.g., a far-field camera. The far-field camera generates data specifying an image including detected objects at distance from the vehicle, e.g., objects not detectable by a near-field camera. For example, the far-field camera may have a high-resolution detector chip than the near-field camera.

Each sensor 28 may define a field-of-view FV. The field-of-view FV of each sensor 28 is a volume relative to, and detectable, by such sensor 28. The volume may be defined by azimuth and altitude angle ranges (also referred to as horizontal FOV and vertical FOV), as well as by a depth or detection distance. The sensor 28 may include a lens 62. The lens 62 may protect components of the sensors 28, e.g., prevent debris (such as water or dirt) from contacting a detector chip (such as a CMOS, CCD, InGaAs, or other conventional chip) of the sensor 28. The lens 62 may be transparent or semitransparent glass, plastic, or other suitable material. The lens 62 is in the field-of-view FV of the sensor 28. In other words, light may have to pass through the lens 62 before being detected by the sensor 28.

Figure 4:
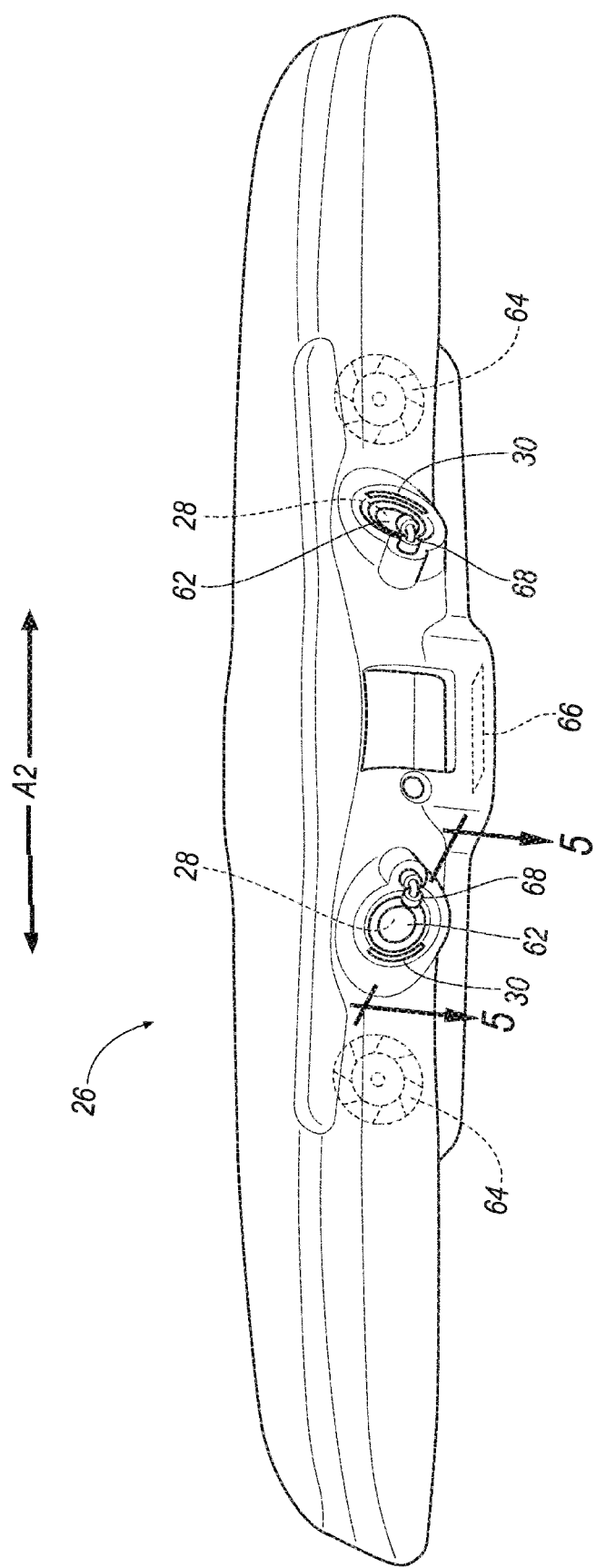
FIG. 4 is a perspective view of the sensor assembly.
Figure 5:
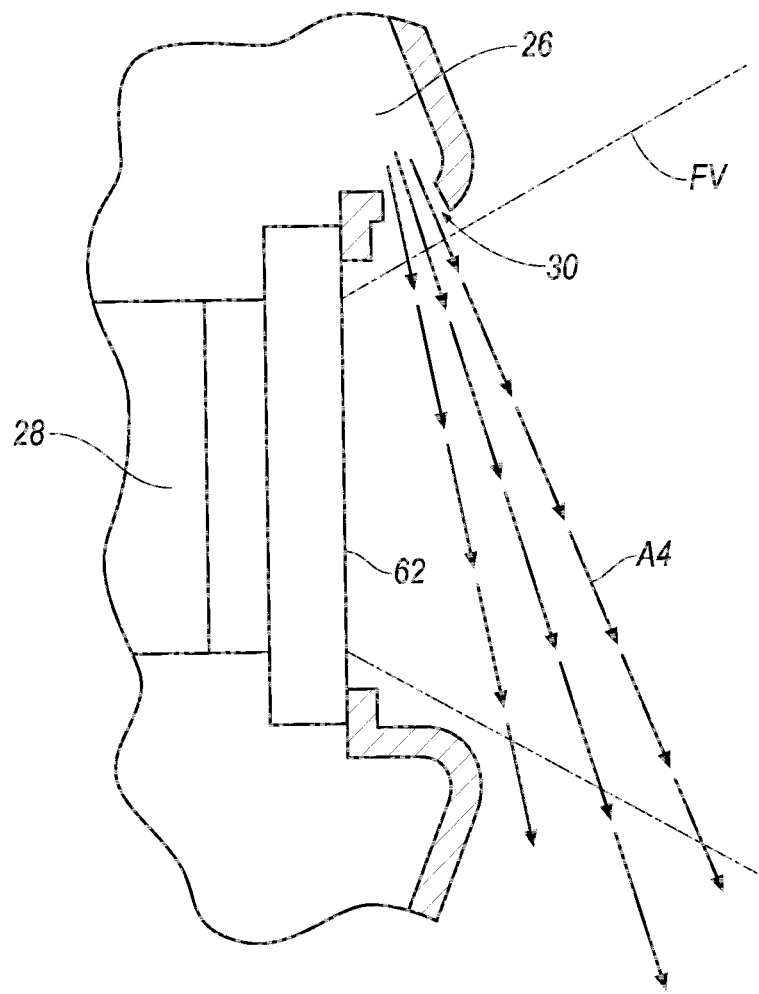
FIG. 5 is a cross section of a portion of the sensor assembly taken along a line 5-5 of FIG. 4.

The vent 30 of the autonomous navigation sensor assembly 26, illustrated in FIGS. 2, 4, and 5, may maintain clarity of the field-of-view FV of one or more of the sensors 28, e.g., air A4 exiting the vent 30 may redirect debris before the debris contacts the lens 62 of the sensors 28 and/or may urge debris on the lens 62 outside of the field-of-view FV of the sensor 28. The vent 30 may include an opening in the housing or other structure through which the air A4 may travel. The vent 30 may include baffles that direct the air A4. The vent 30 faces across the field-of-view FV of one of the sensors 28. In other words, the vent 30 is configured such that the air A4 exiting the vent 30 is directed from one side of the field of the view toward another, e.g., from the vent 30 and directly in front 38 of the sensor 28. The vent 30 may direct the air such that the air A4 is spaced from and/or contacts the lens 62.

The autonomous navigation sensor assembly 26 may include a blower 64, illustrated in FIG. 4. The blower 64 moves air, e.g., between an intake and an exhaust. The blower 64 may include an electric motor, a fan, or other suitable structure for moving air. The blower 64 may be in fluid communication with the vent 30, i.e., such that air may flow from the blower 64 to the vent 30. For example, one or more chambers, passages, channels, etc., may operatively couple the exhaust of the blower 64 to the vent 30 such that air, urged by the blower 64, may flow out of the exhaust, to (and out of) the vent 30, and across the field-of-view FV of the sensor 28.

The autonomous navigation sensor assembly 26 may include an air inlet 66. The air inlet 66 permits air to enter the autonomous navigation sensor assembly 26. The air inlet 66 may include an opening through which air may travel, baffles that direct the air, etc. The air inlet 66 may be in fluid communication with the vent 30, i.e., such that air may flow from the air inlet 66 to the vent 30. The air inlet 66 may be in fluid communication with the vent 30 via the blower 64. For example, the air inlet 66 may be in fluid communication with the intake of the blower 64 and the blower 64 may urge air from the air inlet 66 to the vent 30.

The autonomous navigation sensor assembly 26 may include a nozzle 68. The nozzle 68 may maintain clarity of the field-of-view FV of one or more of the sensors 28, e.g., liquid exiting the nozzle 68 may clean the lens 62 of the sensor 28. The nozzle 68 may be pointed at least one of the sensors 28, i.e., such that liquid from the nozzle 68 is directed toward the sensor 28. For example, the nozzle 68 may be pointed at the lens 62 of the sensor 28 such that liquid from the nozzle 68 contacts the lens 62.

The autonomous navigation sensor assembly 26 is supported by the liftgate 24. For example, the base, the housing, etc., of the autonomous navigation sensor assembly 26 may be fixed to the liftgate 24 via fastener or other suitable structure. The autonomous navigation sensor assembly 26 may be at a top 69 of the liftgate 24 relative to the vertical axis A3. For example, the autonomous navigation sensor assembly 26 may above the window 54. As another example, the autonomous navigation sensor assembly 26 may be at the hinge 52. The autonomous navigation sensor assembly 26 may be spaced from the rearview camera 56. For example, the window 54 may be between the autonomous navigation sensor assembly 26 and the rearview camera 56 relative to the vertical axis A3.

The second autonomous navigation sensor assembly 34 generates data specifying an area relative to the vehicle 22 for use by the computer 50 to operate the vehicle 22 in the autonomous mode. The second autonomous navigation sensor assembly 34 may include sensors 28, nozzles 68, a base, a housing, etc. The second autonomous navigation sensor assembly 34 may be supported on the roof 32. For example, the second autonomous navigation sensor assembly 34 may be fixed to the roof 32 via fastener or other suitable structure. The second autonomous navigation sensor assembly 34 may be in communication with the computer 50, e.g., via the communication network 60.

The vehicle 22 may include one or more fluid reservoirs 70a, 70b and fluid pumps 72a, 72b, e.g., a first fluid reservoir 70a and a first pump 72a at the front 38 of the vehicle 22 (i.e., closer to the front 38 of the vehicle 22 than the rear 40 of the vehicle 22), and a second fluid reservoir 70b and a second pump 72b at the rear 40 of the vehicle 22. The fluid reservoirs 70a, 70b store fluid, such as washing fluid. The fluid pumps 72a, 72b pressurize the fluid from the fluid reservoirs 70a, 70b, e.g., to pump the fluid to the autonomous navigation sensor assemblies 26, 34. The first fluid reservoir 70a and the first pump 72a may be in fluid communication with the autonomous navigation sensor assembly 26 and the second autonomous navigation sensor assembly 34 such that fluid may be pumped by the first pump 72a from the first fluid reservoir 70a to the autonomous navigation sensor assembly 26 and the second autonomous navigation sensor assembly 34. For example, tubes 71 or other suitable structure may connect the first fluid reservoir 70a and the first pump 72a to the nozzles 68 of the autonomous navigation sensor assembly 26 and/or the second autonomous navigation sensor assembly 34. The autonomous navigation sensor assembly 26 may be in fluid communication with the first fluid reservoir 70a and the first pump 72a via the second autonomous navigation sensor assembly 34. Likewise, the second fluid reservoir 70b and the second pump 72b may be in fluid communication with the autonomous navigation sensor assembly 26 and the second autonomous navigation sensor assembly 34.

The communication network 60 includes hardware, such as a communication bus, for facilitating communication among devices and components, e.g., the computer 50, the sensors 28, the steering system, the propulsion system, the brake system, etc. The communication network 60 may facilitate wired or wireless communication among components in accordance with a number of communication protocols such as controller area network (CAN), Ethernet, WiFi, Local Interconnect Network (LIN), and/or other wired or wireless mechanisms The computer 50, implemented via circuits, chips, or other electronic components, is included in the vehicle 22 for carrying out various operations, including as described herein. The computer 50 is a computing device that generally includes a processor and a memory, the memory including one or more forms of computer-readable media and storing instructions executable by the processor for performing various operations, including as disclosed herein. The memory further generally stores remote data received via various communications mechanisms; e.g., the computer 50 is generally configured for communications on a controller area network (CAN) bus or the like, and/or for using other wired or wireless protocols, e.g., Bluetooth, etc. The computer 50 may also have a connection to an onboard diagnostics connector (OBD-II). Via the communication network 60, Ethernet, WiFi, CAN bus, Local Interconnect Network (LIN), and/or other wired or wireless mechanisms, the computer 50 may transmit messages to various devices and components and/or receive messages from the various devices and components. Although one computer 50 is shown in FIG. 6 for ease of illustration, it is to be understood that the computer 50 could include, and various operations described herein could be carried out by, one or more computing devices.

The computer 50 may be programmed to, i.e., the memory may store instructions executable by the processor to, operate the vehicle 22 in the autonomous mode based on data from the autonomous navigation sensor assembly 26 and the second autonomous navigation sensor assembly 34. For example, the computer 50 may identify other vehicle 22, objects, etc., based on data from the autonomous navigation sensor assembly 26 and the second autonomous navigation sensor assembly 34, and may transmit commands to the steering system, the propulsion system, and the braking system, e.g., to avoid impact with a detected obstacle, to maintain a specified distance from another vehicle 22, etc. The computer 50 may operate the vehicle 22 in the autonomous mode based on data from the autonomous navigation sensor assembly 26 and the second autonomous navigation sensor assembly 34 using conventional techniques.

The computer 50 may be programmed to fuse data from autonomous navigation sensor assembly 26 and the second autonomous navigation sensor assembly 34. In other words, the computer 50 may convert data from the sensors 28 of the sensor autonomous navigation assembly 26 and the second autonomous navigation sensor assembly 34 into a same coordinate system, e.g., using conventional techniques for fusing data from multiple sensors for autonomously or semi-autonomously operating a vehicle.

Computing devices, such as the computer 50, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a liftgate;
   a rearview camera that has a resolution and is supported by the liftgate;
   a video screen supported in a passenger cabin and in communication with the rearview camera;
   an autonomous navigation sensor assembly supported by the liftgate, the autonomous navigation sensor assembly having a plurality of sensors and a vent facing across a field-of-view of one of the sensors and directing air exiting the vent from one side of the field-of-view toward another side of the field-of-view, the plurality of sensors including a rearview far-field camera that has a resolution higher than the resolution of the rearview camera; and
   a computer in communication with the autonomous navigation sensor assembly and programed to operate the vehicle in an autonomous mode based on data from the autonomous navigation sensor assembly.

2. The assembly of claim 1, further comprising a window supported by the liftgate, the autonomous navigation sensor assembly above the window.

3. The assembly of claim 1, wherein the plurality of sensors includes a LIDAR sensor.

4. The assembly of claim 1, wherein the autonomous navigation sensor assembly includes a blower in fluid communication with the vent.

5. The assembly of claim 1, wherein the autonomous navigation sensor assembly includes an air inlet.

6. The assembly of claim 1, wherein the autonomous navigation sensor assembly includes a nozzle pointed at least one of the sensors.

7. A vehicle, comprising:
   a liftgate;
   a rearview camera that has a resolution and is supported by the liftgate;
   a video screen supported in a passenger cabin and in communication with the rearview camera;
   an autonomous navigation sensor assembly supported by the liftgate and having a plurality of sensors, the plurality of sensors including a rearview far-field camera that has a resolution higher than the resolution of the rearview camera; and
   a computer in communication with the autonomous navigation sensor assembly and programed to operate the vehicle in an autonomous mode based on data from the autonomous navigation sensor assembly.

8. The vehicle of claim 7, wherein the autonomous navigation sensor assembly is spaced from the rearview camera.

9. The vehicle of claim 7, further comprising a roof and a second autonomous navigation sensor assembly supported on the roof and in communication with the computer.

10. The vehicle of claim 9, wherein the computer is programmed to fuse data from the autonomous navigation sensor assembly and the second autonomous navigation sensor assembly.

11. The vehicle of claim 7, further comprising a roof and a hinge pivotally supporting the liftgate relative to the roof, the autonomous navigation sensor assembly at the hinge.

12. The vehicle of claim 7, further comprising a first fluid reservoir and a first pump in fluid communication with the autonomous navigation sensor assembly.

13. The vehicle of claim 12, further comprising a second fluid reservoir and a second pump at a rear of the vehicle, the first fluid reservoir and the first pump at a front of the vehicle.

14. The vehicle of claim 13, further comprising a second autonomous navigation sensor assembly in fluid communication with the second fluid reservoir and the second pump.

15. The vehicle of claim 7, wherein the autonomous navigation sensor assembly is elongated along a cross-vehicle axis.

16. The vehicle of claim 7, wherein the autonomous navigation sensor assembly is at a top of the liftgate.

17. The vehicle of claim 7, wherein the autonomous navigation sensor assembly includes a nozzle pointed at one of the sensors.

\* \* \* \* \*